United States Patent
Park et al.

(10) Patent No.: US 10,802,202 B2
(45) Date of Patent: Oct. 13, 2020

(54) COMPOSITE SHEET AND DISPLAY DEVICE INCLUDING THE SAME

(71) Applicant: Samsung Display Co., Ltd., Yongin-si (KR)

(72) Inventors: Young Min Park, Hwaseong-si (KR); Ji Eun Nam, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/215,810

(22) Filed: Dec. 11, 2018

(65) Prior Publication Data

US 2019/0361167 A1 Nov. 28, 2019

(30) Foreign Application Priority Data

May 24, 2018 (KR) .......................... 10-2018-0059051

(51) Int. Cl.
*G02B 6/00* (2006.01)
*F21V 8/00* (2006.01)

(52) U.S. Cl.
CPC ......... *G02B 6/0053* (2013.01); *G02B 6/0088* (2013.01)

(58) Field of Classification Search
CPC ..... G02B 6/0053; G02B 6/0088; G02B 6/005
See application file for complete search history.

(56) References Cited

U.S. PATENT DOCUMENTS

| 7,508,607 | B2* | 3/2009 | Sun | G02B 5/0215 359/831 |
| 2013/0095297 | A1* | 4/2013 | Sung | G02B 6/0053 428/172 |
| 2016/0091654 | A1 | 3/2016 | Kim | |
| 2016/0341882 | A1* | 11/2016 | Cho | G02B 5/02 |
| 2017/0343722 | A1* | 11/2017 | Weng | G02B 6/0016 |
| 2018/0106948 | A1* | 4/2018 | Wong | G02B 6/005 |

FOREIGN PATENT DOCUMENTS

| KR | 10-2013-0039463 | 4/2013 |
| KR | 10-2013-0101249 | 9/2013 |
| KR | 10-2016-0084009 | 7/2016 |
| KR | 10-2016-0089686 | 7/2016 |
| KR | 10-2017-0080313 | 7/2017 |

* cited by examiner

*Primary Examiner* — Julie A Bannan
(74) *Attorney, Agent, or Firm* — H.C. Park & Associates, PLC

(57) ABSTRACT

A composite sheet includes a first sheet and a second sheet. The first sheet includes a first substrate and a first optical pattern layer disposed on an upper surface of the first substrate. The second sheet is disposed on the first sheet. The second sheeting includes a second substrate and a second optical pattern layer disposed on an upper surface of the second substrate. An extending direction of the first optical pattern layer intersects an extending direction of the second optical pattern layer such that an intersection angle of the extending direction of the first optical pattern layer and the extending direction of the second optical pattern layer is in a range of 40° to 70°.

6 Claims, 7 Drawing Sheets

COMPOSITE SHEET AND DISPLAY DEVICE INCLUDING THE SAME

CROSS-REFERENCE TO RELATED APPLICATION

This application claims priority from and the benefit of Korean Patent Application No. 10-2018-0059051, filed May 24, 2018, which is hereby incorporated by reference for all purposes as if fully set forth herein.

BACKGROUND

Field

Exemplary embodiments generally relate to a composite sheet and a display device including the same.

Discussion

A conventional liquid crystal display device receives light from a backlight assembly to display an image. Some backlight assemblies include a light source and a light guide plate. The light guide plate receives light from the light source and guides the traveling direction of the light toward a display panel. In some products, the light provided from a light source is white light, and this white light is filtered by a color filter of a display panel to implement colors. It is also noted that a conventional liquid crystal display device may include a composite sheet to secure high luminance and improve luminance uniformity. As the composite sheet, a composite film in which two or more optical function layers are integrated with each other may be used.

The above information disclosed in this section is only for understanding the background of the inventive concepts, and, therefore, may contain information that does not form prior art.

SUMMARY

Some exemplary embodiments provide a composite sheet capable of improving light collection efficiency and a high-luminance display device including the same.

Some exemplary embodiments provide a composite sheet capable of improving luminance uniformity and a display device including the same.

Additional aspects will be set forth in the detailed description which follows, and, in part, will be apparent from the disclosure, or may be learned by practice of the inventive concepts.

According to some exemplary embodiments, a composite sheet includes a first sheet and a second sheet. The first sheet includes a first substrate and a first optical pattern layer disposed on an upper surface of the first substrate. The second sheet is disposed on the first sheet. The second sheeting includes a second substrate and a second optical pattern layer disposed on an upper surface of the second substrate. An extending direction of the first optical pattern layer intersects an extending direction of the second optical pattern layer such that an intersection angle of the extending direction of the first optical pattern layer and the extending direction of the second optical pattern layer is in a range of 40° to 70°.

According to some exemplary embodiments, a display device includes an optical member and a composite sheet disposed on the optical member. The optical member includes: a light guide plate; a low refractive index layer disposed on the light guide plate, the low refractive index layer including a lower refractive index than the light guide plate; a wavelength conversion layer disposed on the low refractive index layer; and a passivation layer disposed on the wavelength conversion layer. The composite sheet includes a first sheet and a second sheet. The first sheet includes a first optical pattern layer. The second sheet includes a second optical pattern layer overlapping the first optical pattern layer. An extending direction of the first optical pattern layer intersects an extending direction of the second optical pattern layer such that an intersection angle of the extending direction of the first optical pattern layer and the extending direction of the second optical pattern layer is in a range of 40° to 70°.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
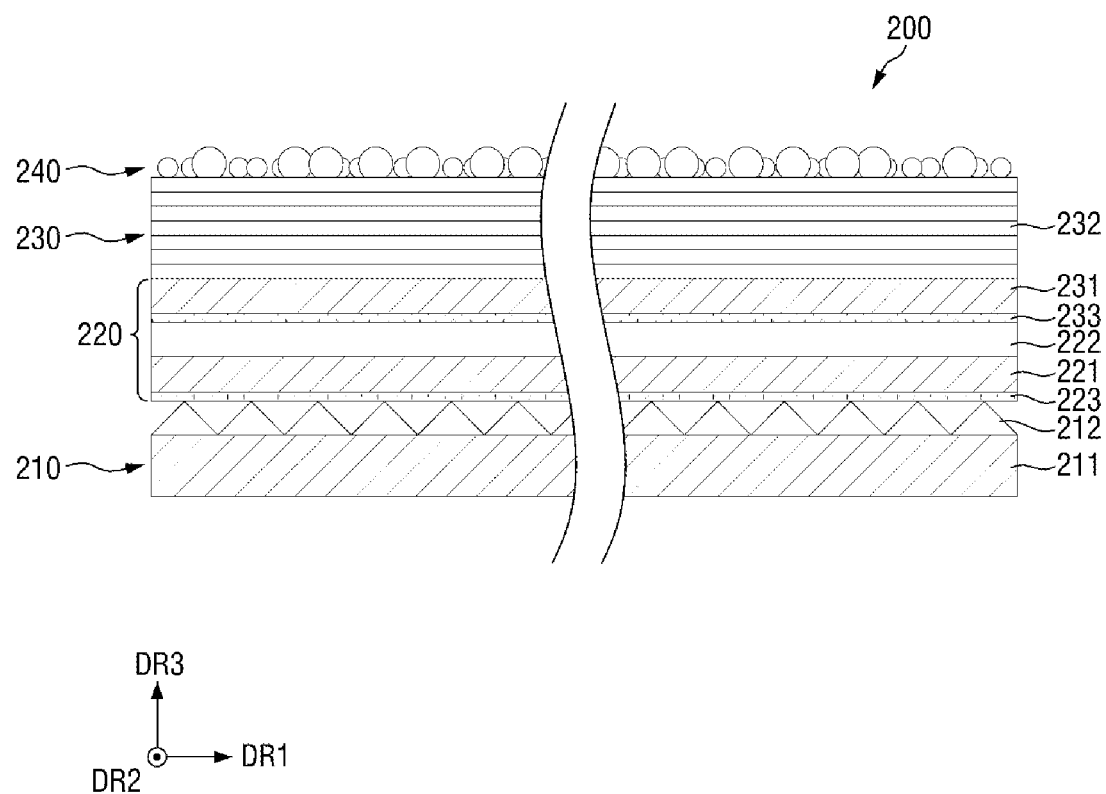
FIG. 1 is a cross-sectional view of a composite sheet according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to cross-sectional views, perspective views, plan views, and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, some exemplary embodiments will be described with reference to the accompanying drawings.

Figure 2:
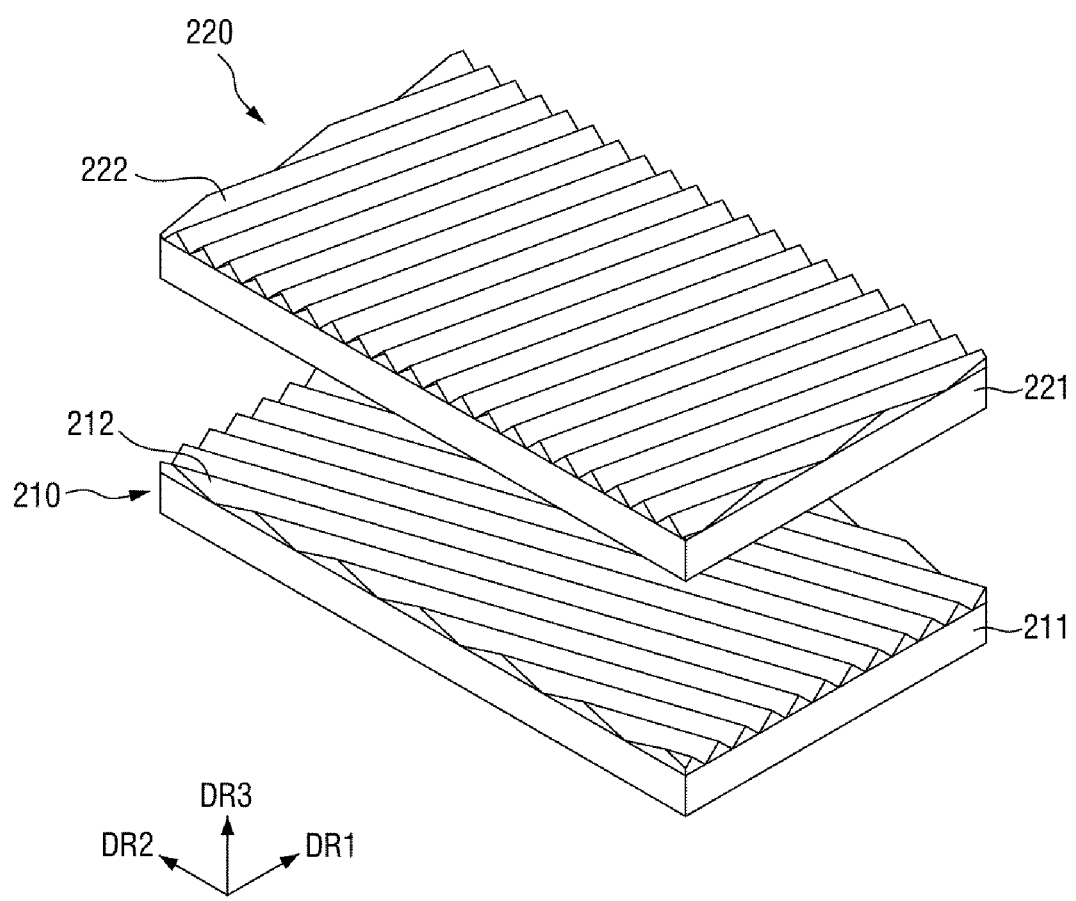
FIG. 2 is a perspective view showing a layout relationship of a first optical pattern layer and a second pattern layer in the composite sheet of FIG. 1 according to some exemplary embodiments.
Figure 3:
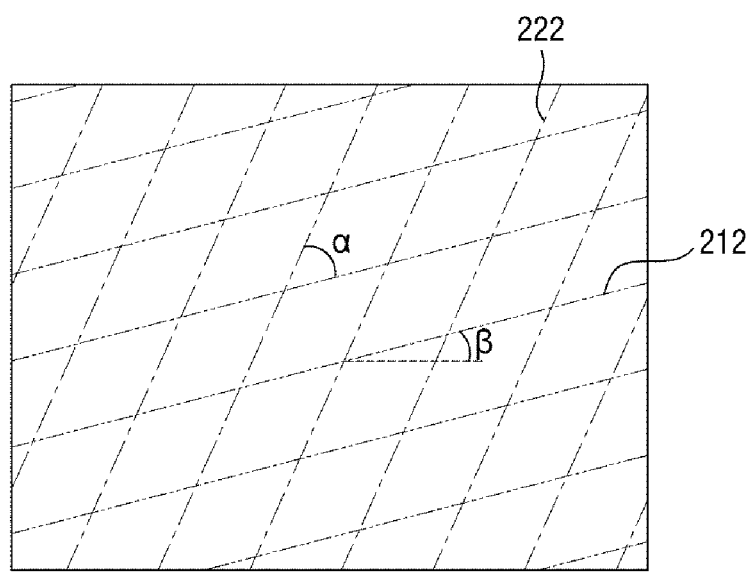
FIG. 3 is a view showing layout angles of a first optical pattern layer and a second pattern layer in the composite sheet of FIG. 1 according to some exemplary embodiments.
Figure 3:
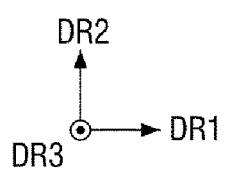

FIG. 1 is a cross-sectional view of a composite sheet according to some exemplary embodiments. FIG. 2 is a perspective view showing a layout relationship of a first optical pattern layer and a second pattern layer in the composite sheet of FIG. 1 according to some exemplary embodiments. FIG. 3 is a view showing layout angles of a first optical pattern layer and a second pattern layer in the composite sheet of FIG. 1 according to some exemplary embodiments.

Referring to FIGS. 1 to 3, a composite sheet 200 may be a composite film in which two or more optical function layers are integrated with each other.

The composite sheet 200 may include a first sheet 210, a second sheet 220, and a third sheet 230 that are integrated with each other. However, the configuration of sheets constituting the composite sheet 200 is not limited thereto, and the composite sheet 200 may include two sheets or may include four or more sheets.

The first sheet 210 may include a first substrate 211 and a first optical pattern layer 212 disposed on an upper surface of the first substrate 211.

The second sheet 220 may include a second substrate 221, a first bonding resin layer 223 disposed on a lower surface of the second substrate 221, and a second optical pattern layer 222 disposed on an upper surface of the second substrate 221.

The third sheet 230 may include a third substrate 231, a second bonding resin layer 233 disposed on a lower surface of the third substrate 231, and an optical layer 232 disposed on an upper surface of the third substrate 231.

The first optical pattern layer 212 includes convex portions and concave portions. Some of the convex portions are in direct contact with or partially penetrate into the first bonding resin layer 223, and thus, the first optical pattern layer 212 is attached to the first bonding resin layer 223. An air layer (or gap) is disposed between the concave portions of the first optical pattern layer 212 and the first bonding resin layer 223.

The second optical pattern layer 222 includes convex portions and concave portions. Some of the convex portions are in direct contact with or partially penetrate into the second bonding resin layer 233, and thus, the second optical pattern layer 222 is attached to the second bonding resin layer 233. An air layer is disposed between the concave portions of the second optical pattern layer 222 and the second bonding resin layer 233.

In some exemplary embodiments, the first optical pattern layer 212 and the second optical pattern layer 222 may be prism pattern layers, and the optical layer 232 of the third sheet 230 may be a dual brightness enhancement film (DBEF). However, exemplary embodiments are not limited thereto. For instance, the first optical pattern layer 212 may be a lenticular pattern layer, and the second optical pattern layer 222 may be a prism pattern layer.

Each of the first to third substrates 211 to 231 may include a polymer material, such as PET (polyethylene terephthalate), PC (poly carbonate), acrylic resin, or the like. The first substrate 211, the second substrate 212, and the third substrate 213 may support the first optical pattern layer 212, the second optical pattern layer 222, and the optical layer 232, respectively. In some exemplary embodiments, the third substrate 231 may be omitted. In this case, the optical layer 232 may be in direct contact with the second bonding resin layer 233.

A diffusion member 240 may be disposed on the third sheet 230. The diffusion member 240 may be, for example, a bead coating layer or a matte coating layer.

The extending direction of the first optical pattern layer 212 and the extending direction of the second optical pattern layer 222 may be different from each other. That is, the extending direction of the first optical pattern layer 212 and the extending direction of the second optical pattern layer 222 may intersect each other.

The intersection angle of the first optical pattern layer 212 and the second optical pattern layer 222, that is, an angle α between the first optical pattern layer 212 and the second optical pattern layer 222 may be about 40° to 70°. When the angle α between the first optical pattern layer 212 and the second optical pattern layer 222 is about 40° to 70°, the light collection efficiency thereof is excellent, and the luminance increase rate thereof is high.

In addition, the first optical pattern layer 212 may be inclined with respect to one side of the first substrate 211. For example, when the first optical pattern layer 212 extends substantially in parallel with a long side of the first substrate 211 and the second optical pattern layer 222 extends substantially in parallel with a short side of the second substrate 221, the first optical pattern layer 212 may be disposed at a predetermined angle with respect to the long side of the first substrate 211. As will be described later, when the composite sheet 200 is disposed on a light guide plate, the extending direction of the first optical pattern layer 212 may be inclined with respect to one side of the light guide plate.

The inclination angle β of the first optical pattern layer 212 with respect to one side of the first substrate 211 may be about 10° to 50°. When the first optical pattern layer 212 is disposed in parallel with one side of the first substrate 211, it is difficult to satisfy TCO Certified[1] viewing angle regulations. In contrast, when the extending direction of the first optical pattern layer 212 is disposed to be inclined at an angle β of about 10° to 50° with respect to one side of the first substrate 211, TCO Certified viewing angle regulations can be satisfied.

[1] TCO Certified is a global sustainability certification, including criteria regarding socially responsible manufacturing, environment, user health, safety, and ergonomic design. TCO Certified is governed by TCO Development AB.

The TCO Certified viewing angle specification means a value obtained by measuring left and right luminance ratios at an angle of ±30° at a point apart from a display device by 1.5 times of the diagonal length of the display device and averaging the left and right luminance ratios. As such, the TCO Certified viewing angle specification measures a capability to maintain a same contrast regardless of a viewing direction. When the TCO Certified value is large, the difference between left luminance and right luminance becomes large, and the viewing angle becomes narrow. In this respect, the TCO Certified value may be less than about 1.73.

Figure 4:
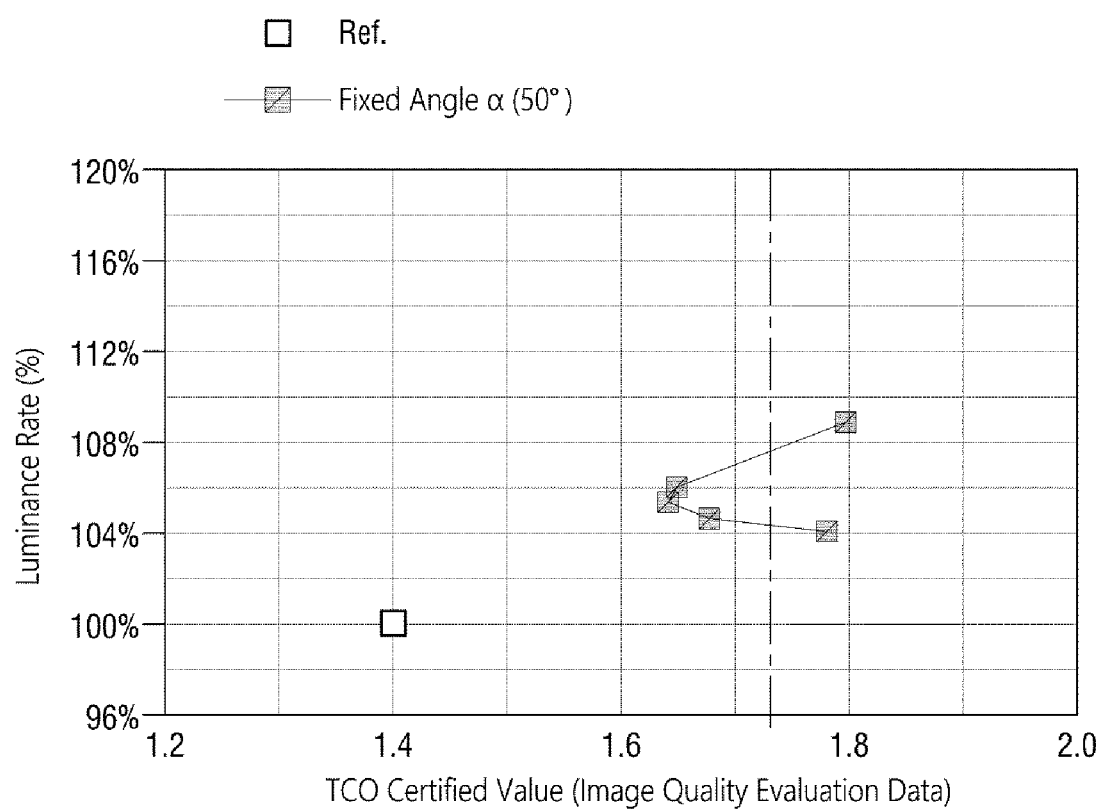
FIG. 4 is a graph showing the TCO Certified value and luminance rate (%) when using a composite sheet according to some exemplary embodiments.

To experimentally evaluate a brightness increasing effect and a TCO Certified value lowering effect caused by the angle between the first optical pattern layer 212 and the second optical pattern layer 222 and the inclination angle of the first optical pattern layer 212, FIG. 4 is used as a reference.

FIG. 4 is a graph showing the TCO Certified value and luminance rate (%) when using a composite sheet according to some exemplary embodiments. For instance, in the graph of FIG. 4, the X-axis represents a TCO Certified value, and the Y-axis represents a luminance rate (%). Test procedures were carried out according to TCO Certified test procedure B.2.2.4 governing luminance uniformity—angular dependence.

There was prepared a composite sheet 200 where the angle α between the first optical pattern layer 212 and the second optical pattern layer 222 was 50°, and the inclination angle β of the first optical pattern layer 212 was 0°, 10°, 20°, 30°, and 40°. As comparative examples, as sheets each including a prism pattern extending in parallel to one side of a substrate layer, a composite sheet 200 composed of a single prism sheet and a composite sheet 200 where the angle α between the first optical pattern layer 212 and the second optical pattern layer 222 was 90° were prepared. The values of TCO Certified and luminance rate (%) are shown in Table 1 and FIG. 4, respectively.

TABLE 1

| Angle α | First Optical Pattern 212 Angle β | Second Optical Pattern 222 Angle β | Luminance (cd/m²) | Luminance Rate | TCO Certified Value |
|---|---|---|---|---|---|
| — | 0° | — | 1828 | 100.0% | 1.40 |
| 90° | 0° | 90° | 2322 | 115.8% | 2.30 |

TABLE 1-continued

| Angle α | First Optical Pattern 212 Angle β | Second Optical Pattern 222 Angle β | Luminance (cd/m²) | Luminance Rate | TCO Certified Value |
|---|---|---|---|---|---|
| 50° | 0° | 50° | 2076 | 104.0% | 1.78 |
| | 10° | 60° | 2087 | 104.5% | 1.68 |
| | 20° | 70° | 2095 | 105.3% | 1.64 |
| | 30° | 80° | 2106 | 105.9% | 1.65 |
| | 40° | 90° | 2162 | 108.8% | 1.80 |

Referring to FIG. 4 and Table 1, in contrast to comparative examples, it can be found that, in the composite sheet 200 where the angle α between the first optical pattern layer 212 and the second optical pattern layer 222 is 50°, luminance increased by about 4% or more. It can also be found that, when the inclination angle β of the first optical pattern layer 212 with respect to one side of the first substrate 211 is 10°, 20°, and 30°, the TCO Certified value is less than 1.73, which satisfies the TCO Certified viewing angle regulation.

In contrast, when the angle between the first optical pattern layer 212 and the second optical pattern layer 222 is 90° and the extending direction of the first optical pattern layer 212 is parallel to one side of the first substrate 211, luminance was increased by about 15.8%, but the TCO Certified value is more than 1.73, which does not satisfy the TCO Certified viewing angle regulation.

Figure 5:
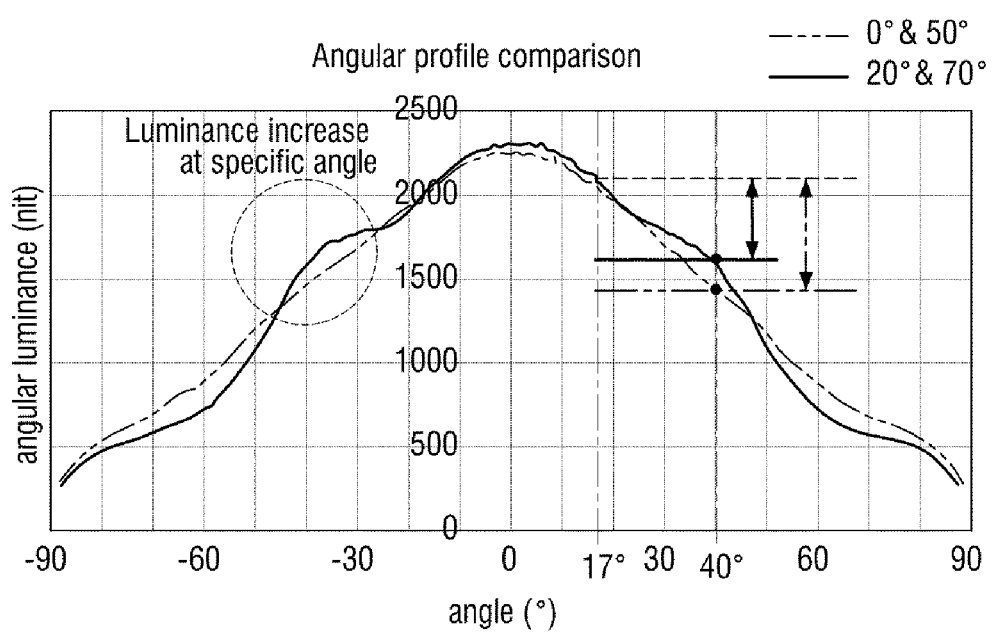
FIG. 5 is a graph showing luminance changes with respect to an angle of the composite sheet in which an angle between the first optical pattern layer and the second optical pattern layer is 50° according to some exemplary embodiments.

FIG. 5 is a graph showing luminance changes with respect to an angle of the composite sheet in which an angle between the first optical pattern layer and the second optical pattern layer is 50° according to some exemplary embodiments. For instance, the X-axis represents a measurement angle with respect to the composite sheet 200, and the Y-axis represents luminance in candela per square meter (cd/m²) according to the measurement angle, where 1 cd/m² is equivalent to 1 nit.

Referring to FIG. 5, it can be found that, when the extending direction of the first optical pattern layer 212 is inclined with respect to one side of the first substrate 211, luminance is high at about 40°, compared to when the extending direction of the first optical pattern layer 212 is parallel to one side of the first substrate 211. As described above, the TCO Certified value is measured at a point apart from a display device by ±30°. In this case, side-lobes occur around the point (e.g., about 40°) influencing the TCO Certified value, and thus, the TCO Certified viewing angle regulation is satisfied.

Hereinafter, additional exemplary embodiments of a composite sheet will be described. In the following exemplary embodiments, a description of the same configuration as a previously described exemplary embodiment will be omitted or simplified, and differences will be mainly described.

Figure 6:
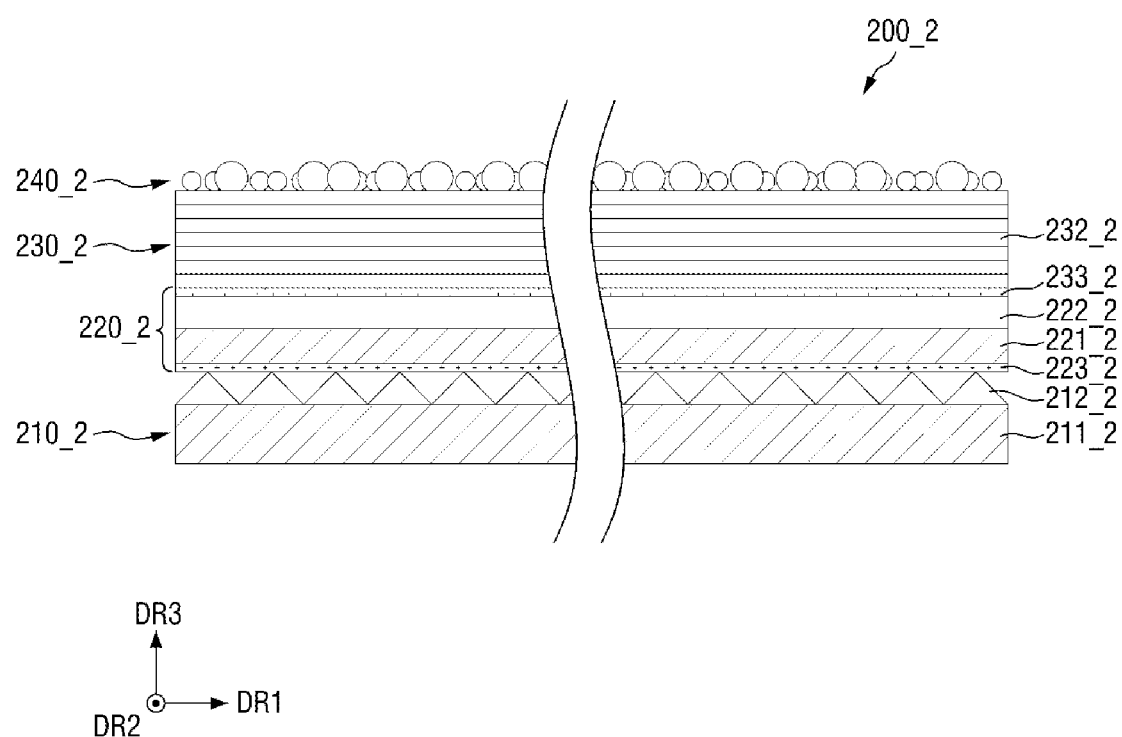
FIG. 6 is a cross-sectional view of a composite sheet according to some exemplary embodiments.

FIG. 6 is a cross-sectional view of a composite sheet according to some exemplary embodiments.

Referring to FIG. 6, a third sheet 230_2 of a composite sheet 200_2 may include an optical layer 232_2 without a substrate.

For example, the composite sheet 200_2 may include a first sheet 210_2, a second sheet 220_2, and a third sheet 230_2 that are integrated with each other.

The first sheet 210_2 may include a first substrate 211_2 and a first optical pattern layer 212_2 disposed on an upper surface of the first substrate 211_2.

The second sheet 220_2 includes a second substrate 221_2, a first bonding resin layer 223_2 disposed on a lower surface of the second substrate 221_2, and a second optical pattern layer 222_2 disposed on an upper surface of the second substrate 221_2.

The third sheet 230_2 may include a second bonding resin layer 233_2 and an optical layer 232_2. The second bonding resin layer 233_2 and the optical layer 232_2 may be in direct contact with each other. That is, the second bonding resin layer 233_2 may be disposed between the second optical pattern layer 222_2 and the optical layer 232_2.

The third sheet 230_2 may not include a substrate. In this case, it is possible to reduce a cost and slim a display device by making the composite sheet 200_2 thinner.

Figure 7:
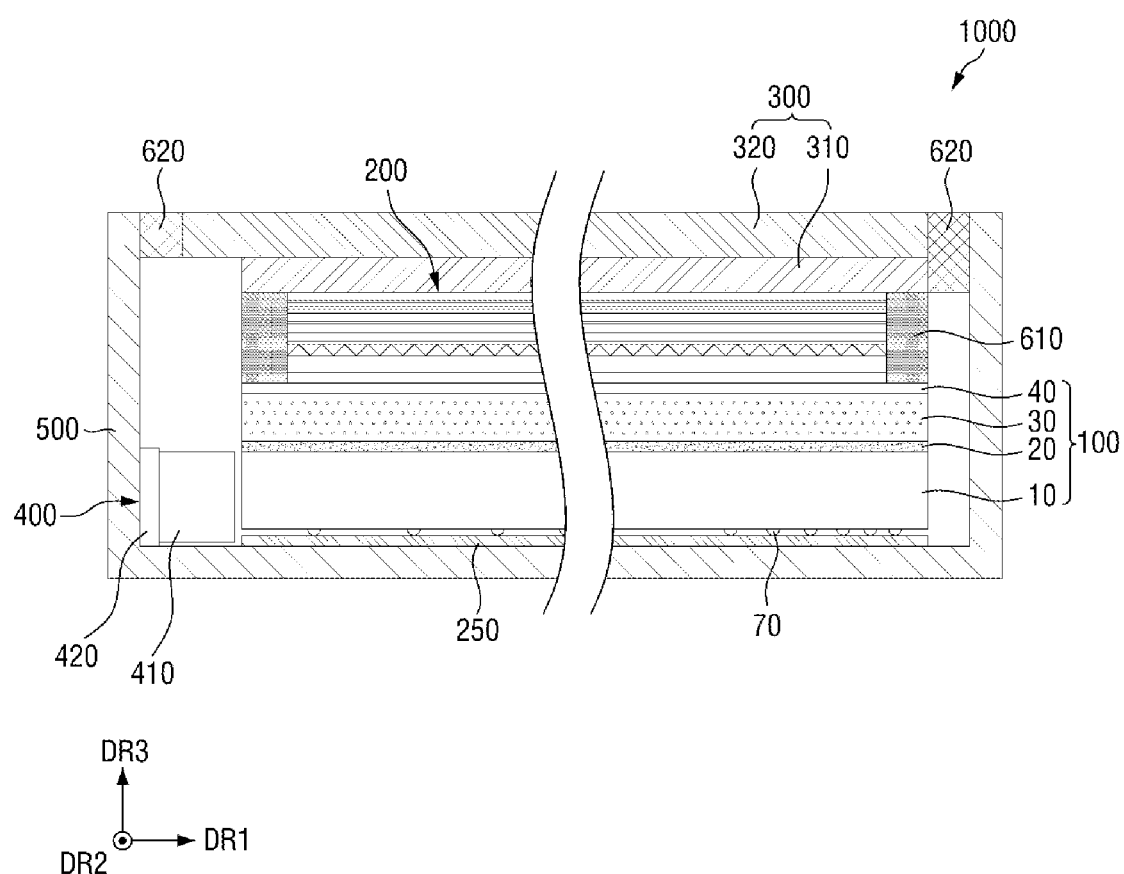
FIG. 7 is a cross-sectional view of a display device including the composite sheet of FIG. 1 according to some exemplary embodiments.

FIG. 7 is a cross-sectional view of a display device including the composite sheet of FIG. 1 according to some exemplary embodiments. Although FIG. 7 illustrates a case where the composite sheet 200 of FIG. 1 is applied, the composite sheet 200_2 of FIG. 6 may be alternatively (or additionally) be applied.

Referring to FIG. 7, a display device 1000 includes a light source 400, an optical member 100 disposed on (or in) a light outgoing path of the light source 400, a composite sheet 200 disposed on the optical member 100, and a display panel 300.

The light source 400 is disposed at one side of the optical member 100. The light source 400 may be disposed adjacent to the light incident surface of a light guide plate 10 of the optical member 100.

The light source 400 may include a plurality of point light sources 410 or line light sources 410. For descriptive convenience, a plurality of point light sources 410 will be described as an example. The plurality of point light sources 410 may be a plurality of light emitting diode (LED) light sources 410. The plurality of LED light sources 410 may be mounted on a printed circuit board 420. The LED light source 400 may emit blue light.

In some exemplary embodiments, the LED light source 400 may be a top-emission type LED that emits light to the top. However, exemplary embodiments are not limited thereto. For instance, the LED light source 400 may be a side-emission type LED that emits light to the side.

The optical member 100 includes the light guide plate 10, a low refractive index layer 20 disposed on the light guide plate 10, a wavelength conversion layer 30 disposed on the low refractive layer 20, and a passivation layer 40 disposed on the wavelength conversion layer 30. The light guide plate 10, the low refractive index layer 20, the wavelength conversion layer 30, and the passivation layer 40 can be integrally coupled.

The light guide plate 10 serves to guide the traveling path of light. The light guide plate 10 may be made of an inorganic material, such as glass, or a polymer resin, such as polymethyl methacrylate (PMMA), polycarbonate (PC), acrylic resin, or the like.

The light guide plate 10 may generally have a polygonal column shape. For example, the light guide plate 10 may have a hexagonal column having a rectangular planar shape. However, the shape of the light guide plate 10 is not limited thereto.

A scattering pattern 70 may be disposed on the lower surface of the light guide plate 10. The scattering pattern 70 serves to change the traveling angle of light traveling in the light guide plate 10 by total reflection and to transmit the light to the outside of the light guide plate 10. In some exemplary embodiments, the scattering pattern 70 may be provided as a separate layer or pattern. However, exemplary embodiments are not limited thereto, and the scattering pattern 70 may be formed to have a surface shape of the light guide plate itself 10.

The arrangement density of the scattering pattern 70 may differ depending on a region. For example, a region adjacent to the light incidence surface having a relatively large amount of traveling light may have low arrangement density, and a region adjacent to the light facing surface having a relatively small amount of traveling light may have a high arrangement density, so that luminance uniformity can be improved.

The low refractive index layer 20 is disposed on an upper surface of the light guide plate 10. The low refractive index layer 20 is formed directly on the upper surface of the light guide plate 10 to be in contact with the upper surface of the light guide plate 10. The low refractive index layer 20 is interposed between the light guide plate 10 and the wavelength conversion layer 30 to help total reflection of the light guide plate 10.

The difference between the refractive index of the light guide plate 10 and the refractive index of the low refractive index layer 20 may be 0.2 or more. When the refractive index of the low refractive index layer 20 is lower than the refractive index of the light guide plate 10 by 0.2 or more, a sufficient total reflection may be performed through the upper surface of the light guide plate 10. The upper limit of the difference between the refractive index of the light guide plate 10 and the refractive index of the low refractive index layer 20 is not limited, but may be 1 or less in consideration of the refractive index of the material of the light guide plate 10 and the low refractive index layer 20.

The refractive index of the low refractive index layer 20 may be in a range of 1.2 to 1.4. When the refractive index of the low refractive index layer 20 is 1.2 or more, an increase in manufacturing cost can be prevented, and when the refractive index of the low refractive index layer 20 is 1.4 or less, it is advantageous to sufficiently reduce the total reflection critical angle on the upper surface of the light guide plate 10. In some exemplary embodiments, a low refractive index layer 20 having a refractive index of about 1.25 may be applied.

The wavelength conversion layer 30 is disposed on an upper surface of the low refractive index layer 20. The wavelength conversion layer 30 converts the wavelength of at least a part of incident light. The wavelength conversion layer 30 may include a binder layer and wavelength conversion particles dispersed in the binder layer. The wavelength conversion layer 30 may further include scattering particles dispersed in the binder layer in addition to the wavelength conversion particles.

The wavelength conversion particles may include a plurality of wavelength conversion particles that convert incident light to different wavelengths. For example, the wavelength conversion particles may include first wavelength conversion particles that convert incident light of a specific wavelength into light of a first wavelength and emit the light, and second wavelength conversion particles that convert incident light of a specific wavelength into light of a second wavelength and emit the light. In some exemplary embodiments, the light emitted from the light source 400 and incident on the wavelength conversion particles may be blue light, the first wavelength may be a green wavelength, and the second wavelength may be a red wavelength. For example, the blue wavelength may be a wavelength having a peak at 420 nm to 470 nm, the green wavelength may be a wavelength having a peak at 520 nm to 570 nm, and the red wavelength may be a wavelength having a peak at 620 nm to 670 nm. However, it should be understood that the blue, green, and red wavelengths are not limited to the above examples and include all wavelength ranges that can be recognized as blue, green, and red.

According to various exemplary embodiments, while the blue light incident on the wavelength conversion layer 30 passes through the wavelength conversion layer 30, a part of the blue light may be incident on the first wavelength conversion particles to be converted into light of a green wavelength and emitted, another part thereof may be incident on the second wavelength conversion particles to be converted into light of a red wavelength and emitted, and the remaining part thereof may be directly emitted without being incident on the first and second wavelength conversion particles. Therefore, the light having passed through the wavelength conversion layer 30 includes light of a blue wavelength, light of a green wavelength, and light of a red wavelength. When the ratio of the emitted light of different wavelengths is appropriately adjusted, white light or light of other colors may be displayed. The converted light in the wavelength conversion layer 30 are concentrated within a narrow range of specific wavelengths, and have a sharp spectrum with a narrow half width. Therefore, when the color of light of such a spectrum is filtered by a color filter, color reproducibility can be improved.

Unlike the above exemplary embodiment(s), incident light of a short-wavelength light, such as ultraviolet light may be utilized, and three kinds of wavelength conversion particles for respectively converting this light into light of light of blue, green, and red wavelengths may be arranged in the wavelength conversion layer 30, so that white light may be emitted.

The passivation layer 40 is disposed on the low refractive index layer 20 and the wavelength conversion layer 30. The passivation layer 40 serves to prevent the penetration of moisture and/or oxygen. The passivation layer 40 may include an inorganic material. For example, the passivation layer 40 may include silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride, or may include a metal thin film.

The low refractive index layer 20, the wavelength conversion layer 30, and the passivation layer 40 may cover most of the upper surface of the light guide plate 10. In some exemplary embodiments, the side surfaces of the low refractive index layer 20, the wavelength conversion layer 30, and the passivation layer 40 may be substantially aligned with the side surface of the light guide plate 10.

The display device 1000 may further include a reflective member 250 disposed under the optical member 100. The reflective member 250 may include a reflective film or a reflective coating layer. The reflective member 250 reflects light emitted from the lower surface of the light guide plate 10 of the optical member 100 and transmits the reflected light into the light guide plate 10 again.

The display panel 300 is disposed over the optical member 100. The display panel 300 receives light from the optical member 100 to display an image. Examples of the light-receiving display panel 300 that receives light and displays an image may include a liquid crystal display panel, an electrophoretic display panel, or the like. Hereinafter, a liquid crystal display panel is exemplified as the display panel 300, but exemplary embodiments are not limited thereto, and various other light-receiving display panels may be utilized.

The display panel 300 includes a first substrate 310, a second substrate 320 facing the first substrate 310, and a liquid crystal layer (not shown) disposed between the first substrate 310 and the second substrate 320. The first substrate 310 and the second substrate 320 overlap each other. In some exemplary embodiments, any one of the substrates may be larger than the other substrate, and thus, the one substrate may protrude outward from the other substrate. Although FIG. 7 illustrates a case where the second substrate 320 is larger than the first substrate 310, and thus, protrudes from the first substrate 310 at the lateral side where the light source 400 is disposed, exemplary embodiments are not limited thereto.

In some exemplary embodiments, the optical member 100 may be coupled with the display panel 300 through an inter-module coupling member 610. The inter-module coupling member 610 may have a rectangular frame shape in a plan view. The inter-module coupling member 610 may be located at the edges of the display panel 300 and the optical member 100.

The composite sheet 200 may be disposed between the optical member 100 and the display panel 300. The composite sheet 200 may be in contact with the inner surface of the inter-module coupling member 610 and attached thereto. However, the layout of the optical member 100, the display panel 300, and the composite sheet 200 is not limited thereto. For example, the optical member 100 may be fixed under the display panel 300 through a mold frame. The mold frame may accommodate the optical member 100 and the composite sheet 200, and the display panel 300 may be disposed on the mold frame.

The display device may further include a housing 500. One side of the housing 500 is open, and the housing includes a bottom surface and side walls connected to the bottom surface. The light source 400, the optical member 100, the composite sheet 200, the display panel 300, and the reflective member 250 may be accommodated in a space defined by the bottom surface and the side walls of the housing 500.

The display panel 300 may be disposed adjacent to the lateral upper end of the housing 500, and may be coupled with the housing 500 by a housing coupling member 620. The housing coupling member 620 may have a rectangular frame shape in a plan view. The housing coupling member 620 may include a polymer resin or an adhesive tape; however, exemplary embodiments are not limited thereto.

The blue light emitted from the LED light source 400 may be incident on the light guide plate 10 of the optical member 100. The light guide plate 10 may guide the traveling path of the light and emit the light through the upper surface or lower surface of the light guide plate 10. The wavelength conversion layer 30 includes wavelength conversion particles or scattering particles to scatter at least light incident into the wavelength conversion layer 30 and emit the light at various angles.

The light having passed through the wavelength conversion layer 30 may have random scattering characteristics in the emission direction. Accordingly, light is incident on the composite sheet 200 at various angles. When the incident angle with respect to the composite sheet 200 is excessively large, it may be difficult to vertically collect the light onto (or into) the display panel 300 even when the light has passed through the composite sheet 200.

For instance, generally, the light having passed through an optical pattern layer in a conventional composite sheet may be incident in a direction perpendicular to the display panel 300 due to the change in traveling angle. However, when the incident angle with respect to the optical pattern layer in the conventional composite sheet is excessively large, it is difficult for light to be vertically incident on the display panel 300 even if the traveling angle of the light is changed by the optical pattern layer. That is, light collection efficiency is lowered.

In particular, when the wavelength conversion layer 30 includes wavelength conversion particles and/or scattering particles therein, light having passed through the wavelength conversion particles and/or scattering particles is emitted at random such that the amount of light having a large incident angle with respect to the optical pattern layer increases. Accordingly, the light collection efficiency of the display panel 300 may be lowered, and the luminance uniformity thereof may be deteriorated.

Thus, the composite sheet 200 according to various exemplary embodiments is disposed over the wavelength conversion layer 30, thereby increasing light collection efficiency and improving luminance. That is, the light emitted from the wavelength conversion layer 30 passes through the second optical pattern layer 222 intersecting the first optical pattern layer 212, and thus, the traveling path of the light is changed such that the light is incident in a direction perpendicular to the display panel 300.

As described above, according to various exemplary embodiments, there can be provided a composite sheet capable of improving light collection efficiency and a high-luminance display device including the same. Further, according to various exemplary embodiments, there can be provided a composite sheet capable of improving luminance uniformity and a display device including the same. The effects of the present invention are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device, comprising:
    an optical member comprising:
        a light guide plate;
        a low refractive index layer disposed on the light guide plate, the low refractive index layer comprising a lower refractive index than the light guide plate;
        a wavelength conversion layer disposed on the low refractive index layer; and
        a passivation layer disposed on the wavelength conversion layer; and
    a composite sheet disposed on the optical member, the composite sheet comprising:
        a first sheet comprising a first optical pattern layer, an extending direction of the first optical pattern layer being inclined with respect to one side of the light guide plate at an angle other than an integer multiple of 90°; and
        a second sheet comprising a second optical pattern layer overlapping the first optical pattern layer, an extending direction of the second optical pattern layer being inclined with respect to the one side of the light guide plate at an angle other than an integer multiple of 90°,
    wherein the extending direction of the first optical pattern layer intersects the extending direction of the second optical pattern layer such that an intersection angle of the extending direction of the first optical pattern layer and the extending direction of the second optical pattern layer is in a range of 40° to 70°, and wherein the angle of the extending direction of the first optical pattern layer is in a range of 10° to 50° with respect to the one side of the light guide plate.

2. The display device of claim 1, wherein the first optical pattern layer is a prism pattern layer.

3. The display device of claim 2, wherein the second optical pattern layer is a prism pattern layer.

4. The display device of claim 1, wherein the wavelength conversion layer comprises at least one of wavelength conversion particles and scattering particles.

5. The display device of claim 4, further comprising:
a third sheet disposed on the second sheet, the third sheet comprising an optical layer.

6. The display device of claim 5, wherein the optical layer is a dual brightness enhancement film (DBEF).

* * * * *